United States Patent [19]

Yoshimura et al.

[11] Patent Number: 4,772,905
[45] Date of Patent: Sep. 20, 1988

[54] INSTANT FILM PACK

[75] Inventors: Kazuyuki Yoshimura; Tadayoshi Shibata; Hideaki Kataoka; Masanobu Kihara, all of Kanagawa, Japan

[73] Assignee: Fuji Photo Film Co., Ltd., Kanagawa, Japan

[21] Appl. No.: 72,703

[22] Filed: Jul. 13, 1987

[30] Foreign Application Priority Data

Jul. 11, 1986 [JP] Japan .................. 61-106547[U]

[51] Int. Cl.⁴ .................. G03B 17/26; G03B 17/52
[52] U.S. Cl. .................. 354/276; 354/86; 354/304
[58] Field of Search .................. 354/86, 276, 277, 304, 354/85

[56] References Cited

U.S. PATENT DOCUMENTS

| | | | |
|---|---|---|---|
| 3,241,468 | 3/1966 | Wolff | 354/304 |
| 3,264,963 | 8/1966 | Finelli | 354/304 |
| 3,479,184 | 11/1969 | Land et al. | 354/86 |
| 3,745,904 | 7/1973 | Bing et al. | 354/304 |
| 3,813,164 | 5/1974 | Skowron et al. | 354/304 |
| 3,899,337 | 8/1975 | Nestor | 354/86 |
| 4,637,703 | 1/1987 | Ono et al. | 354/276 |

*Primary Examiner*—A. A. Mathews
*Attorney, Agent, or Firm*—Young & Thompson

[57] ABSTRACT

In an instant film pack of the type comprising a parallelepipedal housing having a top wall in which an exposure aperture is formed and a front end wall with a film unit exit slot through which an instant film unit is withdrawn, a supporting member is provided to prevent the film unit from being improperly withdrawn. The supporting member comprises a flexible resilient member attached to the bottom of the film pack at the front end and extending in the direction of withdrawal of the film unit. The flexible resilient supporting member is so disposed as to leave a distance of 0 to 6 mm between its front end and the slot defined between an edge controller and a front edge of a guide member of a pack holder in which the film pack is loaded for use.

2 Claims, 3 Drawing Sheets

INSTANT FILM PACK

BACKGROUND OF THE INVENTION

The present invention relates to an instant film pack in which peel-apart type instant film units are contained and removably held.

Certain types of instant film units of the diffusion transfer type are generally contained in a film cassette or film pack in stacked relation and removably held therein. Especially a peel-apart type instant film unit (which is hereinafter referred to as a film unit for simplicity of description), as is disclosed in detail in Japanese Patent Publ. No. 44-2528 for example, basically comprises a photosensitive sheet for forming a latent image thereon and an image-receiving sheet adapted to be registered with the photosensitive sheet for processing in order to form a positive image of the latent image thereon. The film unit is designed to superpose the separate sheets relative to each other after exposure, for diffusion transfer processing. For this purpose, the photosensitive sheet is connected with a carrier sheet and, on the other hand, the image-receiving sheet has superposed thereon a mask sheet having an aperture by which an image-receiving area is defined thereon. The mask sheet is coupled to the carrier sheet.

Such film units are contained in stacked relation in a film pack which has a film unit exit slot at its front end and is used in cooperation with a camera back or a pack holder provided with a pair of pressure-applying members in the form of elongated rollers for applying compressive pressure to the superposed sheets so as to distribute processing liquid therebetween while the exposed sheets are withdrawn from the pack holder.

Upon withdrawing an exposed film unit, a tab relatively weakly connected to the carrier sheet at its leading end is at first withdrawn through a tab exit slot in the pack holder formed apart from the film unit exit slot so that the leading end of the carrier sheet emerges from the pack holder to allow access thereto for withdrawal. When the tab is further withdrawn, the tab is disconnected from the carrier sheet, and the leading end of the carrier sheet proceeds between the pressure-applying rollers. By withdrawing the leading end of the carrier sheet, the photosensitive sheet and the image-receiving sheet are drawn between the pressure-applying rollers and superposed in proper registry relative to each other.

Inside the pack holder there is a guide plate for directing the leading end of the carrier sheet withdrawn from the film pack toward and between the pressure-applying rollers. Between the front end of the guide plate and the pressure-applying rollers there is an edge controlling member disposed for compressively grasping the side edges of the superposed photosensitive and image-receiving sheets to positionally restrict the sheets and to prevent any escape of processing liquid distributed therebetween. This edge controlling member is suspended by a spring member for upward and downward displacement and guides the carrier sheet, and hence the film unit, toward the pressure-applying rollers in cooperative with the guide plate.

When assembling the pack holder, there is often a difference in level between the front edge of the guide plate and the edge controlling member due to manufacturing and/or assembling errors. Such a level difference will block the progress of the leading end of the carrier sheet. For avoiding this level difference, a fine adjustment of the spring force can be performed or an improved supporting mechanism can be provided for the edge controller. These countermeasures are, however, accompanied by great technical difficulties and are costly.

For the reasons stated above, there is thus a substantial chance that the leading end of the carrier sheet will not enter properly between the pressure-applying rollers; and this prevents the instant film unit from successfully emerging from the pack holder even though the tab is properly pulled out.

OBJECTS OF THE INVENTION

It is therefore an object of the present invention to provide an instant film pack which enables the carrier sheet of the instant film unit reliably to enter between a pair of pressure-applying members as the result of pulling the tab member of the instant film unit out of a pack holder.

It is another object of the present invention to provide an instant film pack which enables the instant film unit to be withdrawn reliably from the pack holder.

SUMMARY OF THE INVENTION

According to the present invention, the instant film pack comprises a parallelepipedal housing having a flat top with an exposure aperture formed therein and front end wall with a film unit exit slot through which the instant film units are withdrawn; and instant film supporting means attached to the bottom of the film housing at the front end and extending in the direction of withdrawal of the instant film units, the supporting means being so disposed as to leave a gap of up to 6 mm between its front end and an adjacent slot defined between an edge controller and a rear edge of a guide member on a pack holder in which the film pack is contained for use.

The supporting member is preferably made of a sponge pad and limited in its length so as not to extend outside the film pack in order to prevent it from being bent and/or damaged when handled.

BRIEF DESCRIPTION OF THE DRAWINGS

The above and other objects and features of the present invention will become more apparent to those skilled in the art from the following detailed description with reference to the accompanying drawings, in which.

DETAILED DESCRIPTON OF THE INVENTION

Figure 1:
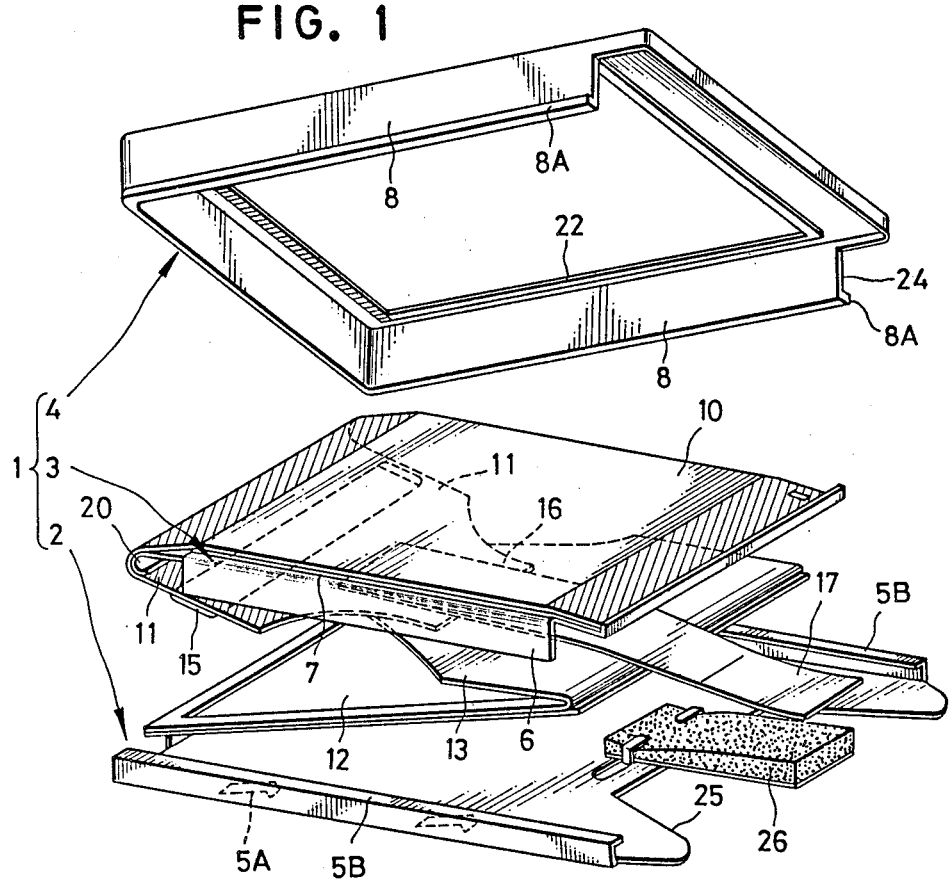
FIG. 1 is an exploded perspective view of an instant film pack depicted with a single peel-apart type instant film unit.

Referring now to FIG. 1, shown therein in an exploded perspective view is a generally parallelepipedal film pack 1 embodying the present invention. The film pack 1 comprises a base 2 formed of thin resilient sheet metal, a top housing 4 formed of, for example, a high-impact polystyrene material and a pressure plate 3 made of a sheet metal. The base 2 is provided with springs tabs 5A and inwardly turned longitudinally extending flanges 5B on both sides thereof. The top housing 4 is provided with downwardly extending, longitudinal side walls 8 having outwardly turned longitudinal flanges 8A adapted to resiliently engage the flanges 5B for forming the film pack 1 so as to enclose the pressure plate 3 and a plurality of film unit. The spring tab 5A are bent upwardly and are adapted to resiliently engage downwardly extending longitudinal walls 6 on the pressure plate 3 for urging the pressure plate 3 upwardly. The top housing 4 includes a generally rectangular flat wall in which an exposure aperture 22 is defined.

A film unit contained in the film pack basically includes a photosensitive sheet 10 comprising any of the commonly used flexible sheet materials, an image-receiving sheet 12 also comprising a conventional flexible sheet material and a carrier sheet 11 attached to a mask sheet 13. The carrier sheet 11 with its trailing end connected to the photosensitive sheet 10 and its leading end attached to a withdrawing tab 17 is adapted to function as a leader. The mask sheet 13 has a leading section connected to the middle of the carrier sheet 11 and a trailing section which comprises a mask for confining a processing liquid between the photosensitive and image-receiving sheets 10 and 12, properly registering the sheets 10 and 12 relative to each other when the sheets 10 and 12 are superposed, and supporting a pod 15 containing a processing liquid. The photosensitive sheet 10 is placed on the flat surface of the pressure plate 3 and the carrier sheet 11 passes around a curved portion 20 formed at one end of the pressure plate 3 and extends behind the rear thereof. The image-receiving sheet 12 and the mask sheet 13 bearing the image-receiving sheet 12 are accommodated in a space formed between the pressure plate 3 and the base 2. In the same way as described above, a plurality of the film units are contained in the film pack in stacked relation, and the foremost photosensitive sheet 10 is pressed against the frame of the top housing 4 so as to be positioned for exposure. The positioning of the foremost photosensitive sheet 10 is effected through the engagement between the spring tabs 5A and the downwardly extending walls 6 of the pressure plate 3.

For withdrawing exposed film units, there is provided an exit slot 24 on one side of the top housing 4. Corresponding to the exit slot 24, the base 2 is formed with a substantially U-shaped opening 25 therein and provided with a sponge pad 26 extending in the direction of withdrawal at the middle of the opening 25. The sponge pad 26, when the film pack is held in the pack holder, is slightly pushed up by a projection on the inner surface of the pack holder so as to thrust up the film units in order to make it easy to withdraw the film unit.

Figure 2:
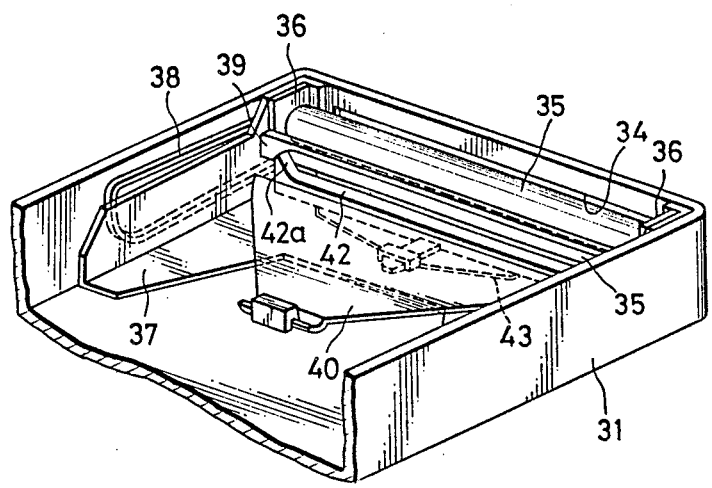
FIG. 2 is a perspective illustration showing a part of a pack holder in which the instant film pack of FIG. 1 is loaded for use.
Figure 3:
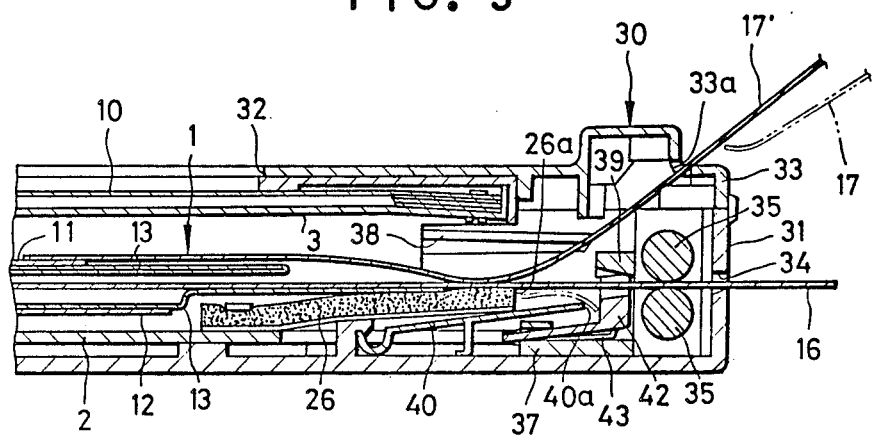
FIG. 3 is a longitudinal sectional view of a film pack loaded in a pack holder and holding a single peel-apart type instant film unit.

Reference is now had to FIGS. 2 and 3 showing the interior mechanism of the pack holder for withdrawing film units. The pack holder 30 in which the film pack 1 is loaded comprises a holder housing 31 and a housing cover 33 formed with an exposure aperture 32 defining an image area on the photosensitive sheet 10. The holder housing 31 and the housing cover 33 are hinged to each other in any well known manner to open and close. In use, the pack holder 30 is attached to a camera in such a way to make the exposure aperture 32 of the housing cover 33 and the exposure aperture of the camera come closely into contact with each other. At the end of the housing cover 33 there is formed an exit slot 33a for the withdrawing tab 17.

In one side wall of the holder housing 31 there is an exit slot 34 through which the film unit is withdrawn after exposure. Adjacent to the film exit slot 34 there is a pair of pressure-applying members in the form of elongated rollers 35 mounted in housing 31 for applying compressive pressure to the photosensitive and image-receiving sheets 10, 11. The pressure-applying rollers 35 are mounted for rotation on a base block 37 by means of bearing blocks 36. Axles at both ends of each pressure-applying roller 35 pass through the bearing blocks 36 and penetrate side walls of the base block 37. The axles of the pressure-applying rollers 35 are engaged by a generally U-shaped spring member 38 to create pressure between the rollers 35 while the photo-sensitive and image-receiving sheets 10, 11 pass therebetween. It is to be noted that the bearing blocks 36 provide a predetermined minimum gap less than the total thickness of the film sheets between the pressure-applying rollers 35 when there is no film unit therebetween. As is seen in FIG. 2, the side walls of the base block 37 are connected by means of a bridge member 39 integral therewith.

On the bottom wall of the holder housing 31 there is a guide plate 40 disposed with an inclination toward the exit slot 34 for directing the leading end 16 of the carrier sheet 11 to the exit slot 34 when the film unit is withdrawn. Between the pressure-applying rollers 35 and the guide plate 40 there is provided an edge controller 42 loosely mounted in base block 37 and urged upwardly by means of a spring member 43 fixed to the base block 37. The edge controller 42 at its both ends has upwardly sloped portions 42a which are restrained from moving upward by means of the under surface of the bridge member 39. The edge controller 42 acts in cooperation with bridge member 39 not only to define a film unit passage but also to grasp side edges of the film unit at the sloped portions 42a. Due to the provision of the sloped portions 42a, the photosensitive and image-receiving sheets 10, 12 are accurately superposed on each other when they are withdrawn between rollers 35 and are brought closely into contact at their edges, thereby preventing the processing liquid distributed therebetween from escaping from the edges.

After exposure, the film unit is withdrawn for processing. For withdrawing the film unit, the tab 17 extending outside the pack holder 30 passing through the tab exit slot 33a is grasped and pulled to force the leading end 16 of the carrier sheet 11 through the film unit exit slot 34. The leading end 16 of the carrier sheet 11 slides over the upper surface of the sponge pad 26 to the right as viewed in FIG. 3 and is guided by the upper surface of the guide plate 40 to enter the gap between the pressure-applying rollers 35. Because this gap is wider than the thickness of the carrier sheet 11, the leading section 16 of the carrier sheet 11 passes freely between the pressure-applying rollers 35 and then through the film unit exit slot 34 to emerge from the pack holder 30. At this time, if the tab 17 is further pulled, the tab 17 is peeled apart from the carrier sheet 11. Simultaneously with this, a tab 17' of the following film unit emerges from the tab exit slot 33a.

For obtaining a printed image on the image-receiving sheet 12 by a diffusion transfer process which takes place outside the pack holder 30, the leading end 16 of the carrier sheet 11 is continuously withdrawn through the film unit exit slot 34 in order to advance the carrier sheet 11. Upon this withdrawing of the carrier sheet 11, the photosensitive and image-receiving sheets 10, 12 are drawn between the pressure-applying rollers 35 and are superposed in proper registry relative to each other. As a result, the pressure-applying rollers 35 compressively rupture the processing liquid pod 15 to release the processing liquid, and distribute the processing liquid between the superposed sheets 10, 12, spreading the processing liquid in a thin, uniform layer therebetween. After a certain time after the film unit has been fully withdrawn from the pack holder 30, the photosensitive sheet 11 is peeled apart from the image-receiving sheet 12, to expose a positive image on the image-receiving sheet 12. The same operation is repeated for each film unit every exposure.

In the film pack 1 of this invention, the sponge pad 26 extends in the direction of withdrawal of the film unit and is adjacent to the front end 40a of the guide plate 40 and the edge controller 42. Because of the provision of the sponge pad 26, the leading end 16 of the carrier sheet 11 is liable to be upwardly inclined upon being withdrawn. As a consequence, even though there is a difference in level between the front end 40a of the guide plate 40 and the edge controller 42, the leading end 16 of the carrier sheet 11 is guided to positively enter the space previously provided between the edge controller 42 and the bridge member 39. That is, an accidental interception of the leading end 16 of the carrier sheet 11 by the edge controller 42 such as is shown by a double dotted line in FIG. 3, can be substantially avoided.

Figure 4:
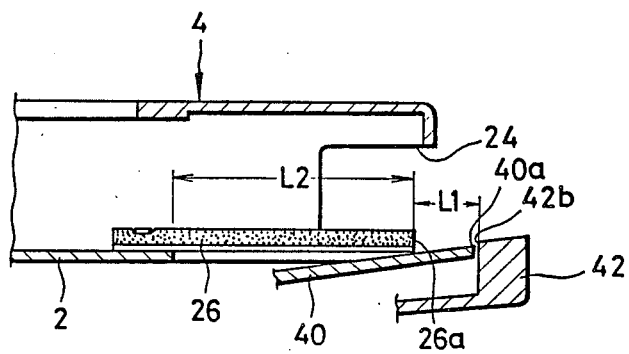
FIG. 4 is a fragmentary cross-sectional illustration showing a principal part of an instant film pack.

As is illustratively shown in FIG. 4, by decreasing the distance L1 between the front end 26a of the sponge pad 26 and the rear edge 42b of the edge controller 42, and providing the leading end 40a of the guide plate 40 positioned as shown relative to the edge controller 42, a very effective measure of counter accidental improper withdrawal of the leading end 16 is provided.

Figure 5:
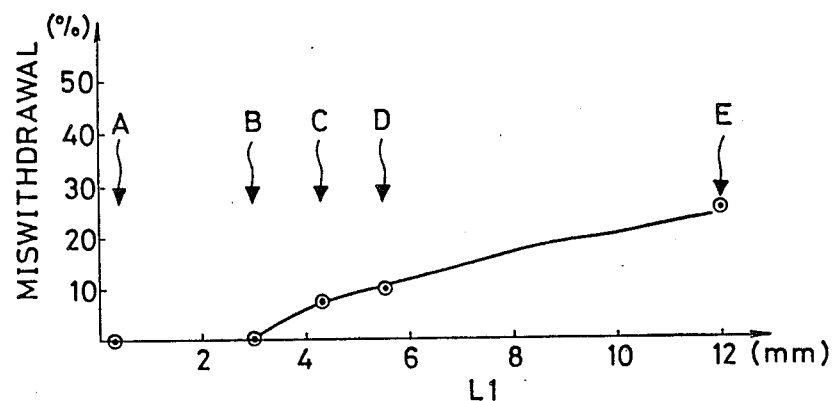
FIG. 5 is a graph of a curve showing the experimental relation between the number of improper withdrawals of instant film units and the distance between the front end of a supporting member and an edge controller.

Reference is now had to FIG. 5, which illustrates the experimental results showing the relationship between the number of improper withdrawals of film units and the length L1, thereby demonstrating the results of the present invention. In this graph, plotted points A, B, C and D on the curve represent the distances L2 between the front end of the U-shaped opening in the base 2 and the front end 26a of the sponge pad 26 and are 37 mm, 34 mm, 33 mm, and 32 mm, respectively. Plotted point E represents the distance L2 of 25.5 mm and the distance L1 of 12 mm of the supporting member for a conventional film pack. It is evident from the experimental results shown in FIG. 5 that the relative number of improper withdrawals of film units is reduced as the distance L1 between the front edge 26a of the sponge pad 26 and the rear edge 42b of the edge controller 42. In particular, it is evident from the experimental results shown in FIG. 5 that the relative number of improper withdrawals of film units is greatly reduced within a range of the distance L1 between 0 and 6 mm.

In any event, it is preferable that the supporting pad is adapted not to extend beyond the instant film exit slot of the film pack in order to prevent it from being bent and/or damaged.

Although the present invention has been fully described by way of the preferred embodiment thereof with reference to the accompanying drawings, various changes and modifications will be apparent to those skilled in the art. Therefore, unless otherwise indicated, such changes and modifications should be construed as included therein.

What is claimed is:

1. In an instant film pack for containing and removably holding a plurality of peel-apart type instant film units having a carrier sheet for withdrawing a said instant film unit, said instant film pack being contained within a pack holder having a pair of pressure-applying members, an edge controlling member for pressing longitudinal edges of said film unit before said film unit reaches said pressure-applying members, and a guide plate inclined upwardly toward said edge controlling member; the improvement comprising a pad having a resilient upper surface, said pad being secured at one end to the bottom of the film pack and overlying the guide plate in cantilever relationship and extending to within 6 mm of the rear of said edge controlling member.

2. An instant film pack as claimed in claim 1, in which said pad has an upper sponge surface.

* * * * *